United States Patent
Chung et al.

(10) Patent No.: US 11,686,050 B2
(45) Date of Patent: *Jun. 27, 2023

(54) METHODS, APPARATUS, AND CHEMICAL COMPOSITIONS FOR SELECTIVELY COATING FIBER-BASED FOOD CONTAINERS

(71) Applicant: Footprint International, LLC, Gilbert, AZ (US)

(72) Inventors: Yoke Dou Chung, Chandler, AZ (US); Yiyun Zhang, Gilbert, AZ (US); Ric Gonzalez, Chandler, AZ (US); Steve Lucero, Chandler, AZ (US); Min Wang, Gilbert, AZ (US)

(73) Assignee: Footprint International, LLC, Gilbert, AZ (US)

( * ) Notice: Subject to any disclaimer, the term of this patent is extended or adjusted under 35 U.S.C. 154(b) by 119 days.

This patent is subject to a terminal disclaimer.

(21) Appl. No.: 16/726,180

(22) Filed: Dec. 23, 2019

(65) Prior Publication Data

US 2020/0208353 A1    Jul. 2, 2020

Related U.S. Application Data

(63) Continuation-in-part of application No. 15/220,371, filed on Jul. 26, 2016, now abandoned.

(51) Int. Cl.
*D21J 1/04* (2006.01)
*D21J 1/06* (2006.01)
(Continued)

(52) U.S. Cl.
CPC ............... *D21J 1/04* (2013.01); *B05B 1/02* (2013.01); *B05B 1/06* (2013.01); *B05B 13/0221* (2013.01);
(Continued)

(58) Field of Classification Search
CPC ........ D21J 1/04; D21J 1/06; D21J 1/10; D21J 7/00; D21H 5/0005; D21H 5/0047;
(Continued)

(56) References Cited

U.S. PATENT DOCUMENTS 1,869,630 A * 8/1932 Stone .................... B31B 50/753
118/56
3,081,018 A    3/1963 Hall
(Continued)

FOREIGN PATENT DOCUMENTS

CN    101624794    1/2010
DE    102015001254 A1    7/2016
(Continued)

OTHER PUBLICATIONS

International Search Report, PCT/US20/66526, dated Apr. 30, 2021, 5pgs.
(Continued)

*Primary Examiner* — Christopher R Harmon
(74) *Attorney, Agent, or Firm* — Jennings, Strouss & Salmon, P.L.C.

(57) ABSTRACT

Methods and apparatus for vacuum forming and subsequently applying topical coatings fiber-based food containers. The slurry includes one or more of an embedded moisture barrier, vapor barrier, and oil barrier, and the topical coating comprises one or more of a vapor barrier, a moisture barrier, an oil barrier, and an oxygen barrier. For food containers having deep sidewalls, a spray coating system includes a first nozzle for applying a full cone spray pattern to the bottom surface of the container, and a second nozzle for applying a hollow cone spray pattern to the inside surfaces of the side walls.

7 Claims, 5 Drawing Sheets

(51) Int. Cl.

| | | |
|---|---|---|
| *B65D 25/34* | (2006.01) | |
| *B05B 1/02* | (2006.01) | |
| *B65D 81/34* | (2006.01) | |
| *D21J 1/10* | (2006.01) | |
| *B05B 13/02* | (2006.01) | |
| *B65D 1/34* | (2006.01) | |
| *B05B 1/06* | (2006.01) | |
| *D21J 7/00* | (2006.01) | |
| *D21H 17/28* | (2006.01) | |
| *D21H 17/17* | (2006.01) | |
| *B29C 41/50* | (2006.01) | |
| *D21H 23/50* | (2006.01) | |
| *D21H 23/22* | (2006.01) | |
| *B05D 1/02* | (2006.01) | |
| *B05B 1/04* | (2006.01) | |

(52) U.S. Cl.
CPC ............... *B05D 1/02* (2013.01); *B29C 41/50* (2013.01); *B65D 1/34* (2013.01); *B65D 25/34* (2013.01); *B65D 81/3453* (2013.01); *D21H 5/0005* (2013.01); *D21H 5/0047* (2013.01); *D21H 17/17* (2013.01); *D21H 17/28* (2013.01); *D21J 1/06* (2013.01); *D21J 1/10* (2013.01); *D21J 7/00* (2013.01); *B05B 1/044* (2013.01); *B05D 2203/22* (2013.01)

(58) Field of Classification Search
CPC .... D21H 17/17; D21H 17/28; B05D 2203/24; B05D 1/02; B05B 1/02; B05B 1/06; B05B 13/0221
See application file for complete search history.

(56) References Cited

U.S. PATENT DOCUMENTS

| | | | |
|---|---|---|---|
| 3,313,467 A | 4/1967 | Anderskow et al. | |
| 4,083,670 A | 4/1978 | Reiters et al. | |
| 4,162,729 A | 7/1979 | Kaiser et al. | |
| 4,198,267 A | 4/1980 | Flaherty | |
| 4,214,948 A | 7/1980 | Mazzarella et al. | |
| 4,353,833 A | 10/1982 | Bruder et al. | |
| 5,038,997 A | 8/1991 | St. Charles | |
| 5,169,497 A | 12/1992 | Sarkar et al. | |
| 5,176,795 A | 1/1993 | St. Charles | |
| 5,193,673 A | 3/1993 | Rathbone et al. | |
| 5,281,446 A * | 1/1994 | Matheson | B05B 13/0609 427/471 |
| 5,502,218 A | 3/1996 | Nicholass et al. | |
| 6,066,375 A * | 5/2000 | Shanton | B65D 81/3446 428/34.2 |
| 6,120,863 A | 9/2000 | Neculescu et al. | |
| 6,168,015 B1 | 1/2001 | Hirokazu | |
| 6,268,414 B1 | 7/2001 | Lin | |
| 7,300,547 B2 | 11/2007 | Luu | |
| 7,466,839 B2 | 12/2008 | Yasugahira | |
| 7,955,670 B2 | 6/2011 | Swoboda et al. | |
| 8,043,539 B2 * | 10/2011 | Ozasa | B29C 44/569 264/46.4 |
| 8,632,659 B2 | 1/2014 | Erhardt et al. | |
| 8,715,464 B2 | 5/2014 | Young, Jr. et al. | |
| 8,770,465 B2 | 7/2014 | Rometty | |
| 8,821,689 B1 | 9/2014 | Holland et al. | |
| 9,023,443 B2 | 5/2015 | Paollilli et al. | |
| 9,370,912 B2 | 6/2016 | Urban | |
| 9,556,563 B1 | 1/2017 | Yang | |
| 9,856,608 B1 | 1/2018 | Chung et al. | |
| 9,869,062 B1 * | 1/2018 | Chung | B05D 1/02 |
| 10,815,622 B2 | 10/2020 | Chung et al. | |
| 2003/0038054 A1 | 2/2003 | Hurley et al. | |
| 2004/0105941 A1 | 6/2004 | Terada et al. | |
| 2005/0150624 A1 | 7/2005 | Toh et al. | |
| 2005/0218013 A1 | 10/2005 | Tabeshnekoo | |
| 2008/0245697 A1 | 10/2008 | Lerner | |
| 2009/0266737 A1 | 10/2009 | Cole | |
| 2011/0308751 A1 | 12/2011 | Moncia et al. | |
| 2012/0058332 A1 | 3/2012 | Mueller et al. | |
| 2012/0103854 A1 | 5/2012 | Ooi | |
| 2012/0225300 A1 | 9/2012 | Kawana | |
| 2012/0248101 A1 | 10/2012 | Tumber et al. | |
| 2013/0248401 A1 | 9/2013 | Nakase | |
| 2013/0319627 A1 | 12/2013 | Van Haute | |
| 2014/0096487 A1 | 4/2014 | Nolsen et al. | |
| 2014/0300026 A1 | 10/2014 | Taccolini | |
| 2016/0016702 A1 | 1/2016 | Siskindovich et al. | |
| 2016/0221742 A1 * | 8/2016 | Edwards | B65B 29/08 |
| 2018/0016750 A1 | 1/2018 | Lauria | |
| 2018/0030660 A1 | 2/2018 | Chung et al. | |
| 2018/0148894 A1 * | 5/2018 | Hemmes | D21C 5/02 |
| 2019/0194870 A1 * | 6/2019 | Kuo | D21H 19/20 |
| 2020/0206984 A1 * | 7/2020 | Chung | D21H 17/675 |

FOREIGN PATENT DOCUMENTS

| | | |
|---|---|---|
| EP | 1492926 | 4/2007 |
| EP | 2492395 | 8/2012 |
| FR | 2621895 | 4/1989 |
| FR | 2635505 | 2/1990 |
| JP | 1046500 | 2/1998 |
| JP | 2001097351 | 4/2001 |
| JP | 2002138399 | 5/2002 |
| JP | 2006-206103 | 8/2006 |
| JP | WO2012117674 | 9/2012 |
| TW | M593373 U | 4/2020 |
| WO | 03/3044279 | 5/2003 |
| WO | WO03087471 | 10/2003 |
| WO | WO2005095710 | 10/2005 |
| WO | WO2006057610 | 6/2006 |
| WO | WO2010064899 | 6/2010 |
| WO | WO2012061704 | 5/2012 |

OTHER PUBLICATIONS

Written Opinion, PCT/US20/66526, dated Apr. 30, 2021, 5pgs.
ARIPO Harare Protocol, Search and Examination Report—Form 18, Application No. AP/P/ 2019/011358, dated Jul. 13, 2021; 4pgs.
International Preliminary Report on Patentability, PCT/US17/44036 dated Feb. 7, 2019; 13 pgs.
International Search Report, PCT/US17/44036 dated Oct. 10, 2017; 3 pgs.
EPO Search Report—EP Appl. No. 17835236.5 dated Dec. 19, 2020; 9pgs.
Written Opinion, PCT/US17/44036 dated Oct. 10, 2017; 11 pgs.
Solenis LLC, Product Data, "Hercobond 6950 Paper Performance Additive", Jan. 12, 2016. 10 pgs.
Mohamed Naceur Belacem & Antonio Pizzi, "Lignocellulosic Fibers and Wood Handbook, Renewable Materials For Today's Environment", 2016, John Wiley & Sons, Hoboken, New Jersey. Screenshot front cover of handbook and preface; 24 pgs.
Liisa Ohlsson & Robert Federer, "Efficient Use of Flourescent Whitening Agents and Shading Colorants in The Production of White Paper and Board", Oct. 8-11, 2002, CIBA Speciality Chemicals Inc., South Africa, 5pgs.
John F. Kennedy, Glyn O. Philips and Peter A. Williams, "Cellulosic Pulps, Fibers and Materials", Published 2000, Woodhead Publishing Limited, Cellucon '98 Finland. Screenshots 2pgs.
Fobchem's Alkyl Keten Dimer (ADK WAZ). Screenshot 1 pg. www.fobchem.com.
Ashland Chemicals, Product Catalog "Ashland Always Solving", Aug. 3, 2018, Screenshot 1pg.
Shandong Tiancheng Chemical Co., Ltd., "AKD Wax", Screenshot 1pg.
World of Chemicals, Connecting Everything Related to Chemistry, "Unidyne TG-8111", Screenshot 1 pg.
Australian Examination Report for AU2017302297 dated Jun. 24, 2022, 7 pages.
Non-Final Office Action dated Jul. 29, 2022 for U.S. Appl. No. 16/877,419.

(56) References Cited

OTHER PUBLICATIONS

Malaysian Examination Report, PI2019000469, dated Dec. 17, 2021; 4 pgs.
International Search Report, PCT/US21/53544, dated Jan. 10, 2022; 3 pages.
Written Opinion of the International Search Authority, PCT/US21/53544, dated Jan. 10, 2022; 5 pages.

* cited by examiner

METHODS, APPARATUS, AND CHEMICAL COMPOSITIONS FOR SELECTIVELY COATING FIBER-BASED FOOD CONTAINERS

REFERENCE TO RELATED APPLICATION

The present application is a continuation-in-part application of, and claims priority to, U.S. patent application Ser. No. 15/220,371 filed Jul. 26, 2016, the entire contents of which are hereby incorporated herein by this reference.

TECHNICAL FIELD

The present invention relates, generally, to spray coatings for use with vacuum formed molded fiber food containers and, more particularly, to selective combinations of slurry chemistries and surface coatings to yield desired oil, water, vapor, and/or oxygen barriers.

BACKGROUND

Pollution caused by single use plastic containers and packaging materials is epidemic, scarring the global landscape and threatening delicate ecosystems and the life forms that inhabit them. Single use containers migrate along waterways to the oceans in the form of Styrofoam and expanded polystyrene (EPS) packaging, to-go containers, bottles, thin film bags and photo-degraded plastic pellets.

This ocean trash accumulates into massive patches of highly concentrated plastic islands located at each of our oceans' gyres. Sunlight and waves cause floating plastics to break into increasingly smaller particles, but they never completely disappear or biodegrade. Moreover, plastic particles act as sponges for waterborne contaminants such as pesticides. Fish, turtles and even whales eat plastic objects, which can sicken or kill them. Smaller ocean animals ingest tiny plastic particles and pass them on to us when we eat seafood.

Sustainable solutions for reducing plastic pollution are gaining momentum. However, continuing adoption requires that these solutions not only be good for the environment, but also competitive with plastics from both a performance and a cost standpoint. The present invention involves replacing plastics with revolutionary technologies in molded fiber without compromising product performance, and offers a competitive cost structure within an ecologically responsible framework.

By way of brief background, molded paper pulp (molded fiber) has been used since the 1930s to make containers, trays and other packages, but experienced a decline in the 1970s after the introduction of plastic foam packaging. Paper pulp can be produced from old newsprint, corrugated boxes and other plant fibers. Today, molded pulp packaging is widely used for electronics, household goods, automotive parts and medical products, and as an edge/corner protector or pallet tray for shipping electronic and other fragile components. Molds are shaped as a mirror image of the finished package, with a screen is attached to its surface. A vacuum is drawn across the screen to build up fiber particles into the shape of the finished product.

The two most common types of molded pulp are classified as Type 1 and Type 2. Type 1 is commonly used for support packaging applications with 3/16 inch (4.7 mm) to ½ inch (12.7 mm) walls. Type 1 molded pulp manufacturing, also known as "dry" manufacturing, uses a fiber slurry made from ground newsprint, kraft paper or other fibers dissolved in water. A mold mounted on a platen is dipped or submerged in the slurry and a vacuum is applied to the generally convex backside. The vacuum pulls the slurry onto the mold to form the shape of the package. While still under the vacuum, the mold is removed from the slurry tank, allowing the water to drain from the pulp. Air is then blown through the tool to eject the molded fiber piece. The part is typically deposited on a conveyor within a drying oven.

Type 2 molded pulp manufacturing, also known as "wet" manufacturing, is typically used for packaging electronic equipment, cellular phones and household items with containers that have 0.02 inch (0.5 mm) to 0.06 inch (1.5 mm) walls. Type 2 molded pulp uses the same material and follows the same basic process as Type 1 manufacturing up the point where the vacuum pulls the slurry onto the mold. After this step, a transfer mold mates with the fiber package, moves the formed "wet part" to a hot press, and compresses and dries the fiber material to increase density and provide a smooth external surface finish. See, for example, stratasys.com/solutions/additive-manufacturing/tooling/molded-fiber; keiding.com/molded-fiber/manufacturing-process/; Grenidea Technologies PTE Ltd. European Patent Publication Number EP 1492926 B1 published Apr. 11, 2007 and entitled "Improved Molded Fiber Manufacturing"; and afpackaging.com/thermoformed-fiber-molded-pulp/. The entire contents of all of the foregoing are hereby incorporated by this reference.

Fiber-based packaging products are biodegradable, compostable and, unlike plastics, do not migrate into the ocean. However, presently known fiber technologies are not well suited for use with meat and poultry, prepared food, produce, microwavable food, or as lids for beverage containers such as hot coffee. In particular, selectively integrating one or more oil, water, vapor, and/or oxygen barriers into the slurry, and/or selectively applying one or more of the barrier layers to all or a portion of the surface of the finished packaging product, can be cumbersome, time consuming, and expensive.

Methods, apparatus, spray systems, and chemical formulations are thus needed which overcome the limitations of the prior art.

Various features and characteristics will also become apparent from the subsequent detailed description and the appended claims, taken in conjunction with the accompanying drawings and this background section.

BRIEF SUMMARY

Various embodiments of the present invention relate to methods, chemical formulae, spray systems, and nozzle configurations for manufacturing and selectively applying barrier coatings to selected surfaces of vacuum molded, fiber-based packaging and container products including, inter alia: i) meat, produce, horticulture, and utility containers embodying novel geometric features which promote structural rigidity; ii) meat, produce, and horticulture containers having embedded and/or topical moisture, oil, oxygen, and/or vapor barriers; iii) microwavable, oven-heated, frozen food, ready to eat, yogurt, salad, prepared foods, macaroni and cheese, and other containers embodying embedded and/or topical moisture, oil, oxygen, and/or vapor transmission barriers, and/or retention aids to improve chemical bonding within the fiber matrix; and iv) meat containers embodying a moisture/vapor barrier which preserves structural rigidity over an extended shelf life.

It should be noted that the various inventions described herein, while illustrated in the context of conventional slurry-based vacuum form processes, are not so limited. Those skilled in the art will appreciate that the inventions described herein may contemplate any fiber-based manufacturing modality, including dry or fluff processes which may or may not involve vacuum forming, including 3D printing techniques.

Various other embodiments, aspects, and features are described in greater detail below.

BRIEF DESCRIPTION OF THE DRAWING FIGURES

Exemplary embodiments will hereinafter be described in conjunction with the appended drawing figures, wherein like numerals denote like elements, and:

DETAILED DESCRIPTION OF PREFERRED

Exemplary Embodiments

Figure 1:
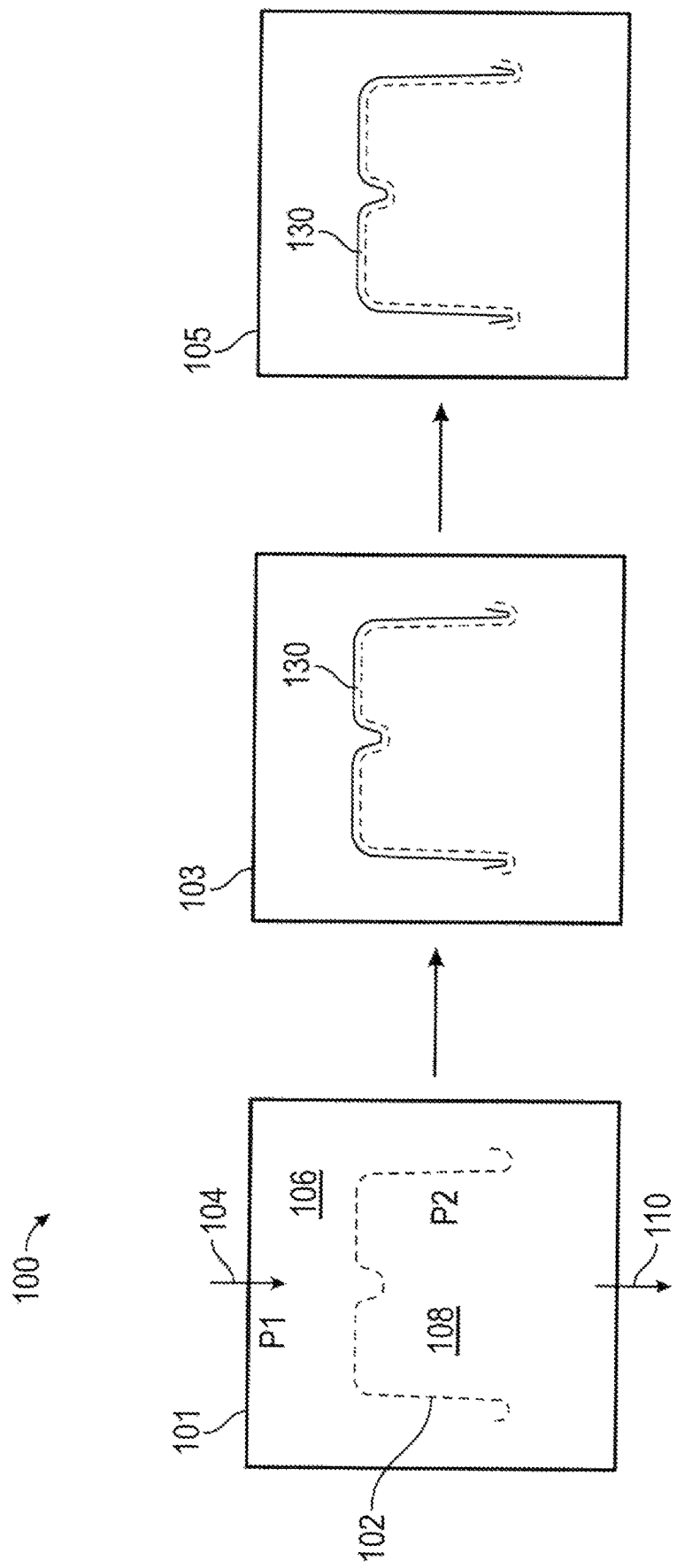
FIG. 1 is a schematic block diagram of an exemplary vacuum forming process using a fiber-based slurry in accordance with various embodiments.

The following detailed description of the invention is merely exemplary in nature and is not intended to limit the invention or the application and uses of the invention. Furthermore, there is no intention to be bound by any theory presented in the preceding background or the following detailed description.

Various embodiments of the present invention relate to fiber-based or pulp-base products for use both within and outside of the food and beverage industry. By way of non-limiting example, the present disclosure relates to particular chemical formulations of slurries and topical films or coatings adapted to address the unique challenges facing the food industry including oil barriers, moisture barriers, water vapor barriers, oxygen barriers, strength additives, and retention aids, the absence of which have heretofore limited the extent to which fiber-based products can effectively replace single use plastic containers in the food industry. Coupling surface coating techniques (e.g., spray coating, immersion) with novel slurry chemistries enables fiber-based products to replace their plastic counterparts in a wide variety of applications such as, for example: frozen, refrigerated, and non-refrigerated foods; medical, pharmaceutical, and biological applications; microwavable and oven safe food containers; beverage cups and lids; comestible and non-comestible liquids; substances which liberate water, oil, and/or water vapor during storage, shipment, and preparation (e.g., cooking); horticultural applications including consumable and landscaping/gardening plants, flowers, herbs, shrubs, and trees; chemical storage and dispensing apparatus (e.g., paint trays); produce (including human and animal foodstuffs such as fruits and vegetables); salads; prepared foods; packaging for meat, poultry, and fish; lids; cups; bottles; guides and separators for processing and displaying the foregoing; edge and corner pieces for packing, storing, and shipping electronics, mirrors, fine art, and other fragile components; buckets; tubes; industrial, automotive, marine, aerospace and military components such as gaskets, spacers, seals, cushions, and the like; and associated molds, wire mesh forms, recipes, spray systems and spray nozzle configurations and processes, chemical formulae, tooling, slurry distribution, chemical monitoring, chemical infusion, and related systems, apparatus, methods, and techniques for manufacturing the foregoing components.

Various embodiments of spray coating techniques surround oil barriers and/or vapor barriers for microwave bowls, as well as for meat trays to address the phenomenon whereby water and/or oil penetrates the tray surface, and pulls off with the meat after freezing. In addition, spray coating may have applicability to beverage lids, for example, to mitigate undesirable staining (e.g., lipstick).

In some embodiments, the microwave bowls, steamers, or trays are spray coated on the inside surface only; other embodiments contemplate spray coating on both the inside and outside surfaces. For spray applications, the spray nozzles may be configured to apply a spray pattern which closely approximates the surface being coated (e.g., circular, annular, rectangular, and the like).

Various spray, immersive, or other coating modalities employ chemistries adapted to yield desired performance characteristics in the finished products. Various chemical formulations comprise alginates (e.g., algae derivatives) mixed with a polyester emulsion and applied to a surface of the container to mitigate the transmission of water vapor through the container wall (e.g., the bottom surface) upon heating (e.g., using a microwave or conventional oven). Various chemical formulations may also include a calcium carbonate component to facilitate bonding of the coating to the surface of the fiber-based container. In many applications, the coatings also effectively mitigate oil transmission.

These coating chemistries may be used in lieu of (or in addition to) incorporating TG8111 based fluorochemistries into the slurry, as described elsewhere herein. In some embodiments, even though the surface coating may have secondary oil barrier attributes in addition to primary vapor barrier and/or water barrier attributes, it may nonetheless be desirable to also embed an oil barrier component into the slurry.

Various surface coating embodiments contemplate chemistry aspects as well as process aspects (e.g., the manner in which the formulation is applied to the surface(s) to achieve desired coverage objectives). Process considerations include, but are not limited to, spray droplet size, sprayer configurations and orientations, spray geometries, as well as "fill and go" techniques in which a container (e.g., yogurt) is filled with a coating formulation and quickly emptied to yield a film on the inside surface(s).

In this regard, vapor barriers (e.g., to prevent frozen foods from drying out while frozen) and oxygen barriers (to preserve freshness and shelf life during refrigeration) typically require complete (e.g., 100%) coverage of the protected surface, whereas moisture (e.g., water) barrier coatings (e.g., to prevent meat from sticking to the meat tray after one or more freeze/thaw cycles or to prevent starches from sticking to microwave bowls) can be effective at substantially less than complete surface coverage.

In various embodiments, spray and other coating processes may be used to apply vapor, oxygen, moisture, and/or oil barriers to surface(s) of a finished container, either in addition to or in lieu of incorporating one or more barrier chemistries into the slurry used to vacuum mold the container. In a preferred embodiment, a moisture barrier component is mixed into the slurry, and an oil and/or vapor barrier applied to the formed container, for example when only the inside surfaces are to be coated (e.g., for non-stick barriers).

Spray coating applications contemplate, inter alia, microwave bowls, frozen food, and meat trays. Depending on the application, it may be desirable to spray coat one or more of a water, vapor, oil, and an oxygen barrier. For microwave bowls, to the extent the issue is shelf life, 100% coverage may not necessarily be required. Spray techniques may be used to apply water and/or vapor barriers, but also to prevent "sticking" so the meat (after one or more cycles of freezing/thawing) doesn't tear away paper fibers when removed from the tray in the frozen condition (does not require 100% coverage). Yogurt and other applications use spray coating for water vapor and oxygen barriers, which typically do require near 100% coverage.

Spray coating use cases generally involve: i) the chemical formulation of the coating being applied; ii) the thermophysical, rheological and viscoelastic properties; iii) the apparatus for applying the coating to one or more surfaces (or portions of a surface) of the container, package, or other workpiece; and iv) process parameters such as drying time and temperature.

A typical use case involving spray coating surrounds coating a meat tray with a moisture barrier to help prevent the meat from sticking to the fiber tray after freezing. A top (surface) coating may be applied (via spray or otherwise) to reduce the extent to which the meat sticks to the tray after freezing. The coating also helps sustain the strength and rigidity of the tray even without freezing, for example while the meat and juices sit in the tray in the refrigerator.

An exemplary method of manufacturing a spray coated meat tray may begin with an aqueous fiber based slurry comprising up to 100% OCC or any desired combination of OCC and double-lined kraft (DLK) paper. (Alternatively, the various slurry bases described herein may comprise a mixture of recycled and virgin fiber, or the slurry base may comprise 100% virgin fiber (e.g., hardwood, softwood, or a combination thereof) as discussed below in conjunction with microwave bowls).

A water/moisture barrier (e.g., 2 to 5%, and preferably about 4% AKD), a dry strength additive (e.g., 0.5 to 4.5% and preferably about 4% starch Hercobond 6950 or modified starch), and a wet strength additive (e.g., Kymene) may be added to the slurry. After the trays are vacuum formed (for example after being dried in the hot press for approximately 55 seconds), the trays are transferred to a stacker and the stacks of trays are transferred to a spray coating station where they are de-nested and dropped into respective pockets on a conveyor whereupon a supplemental moisture coating is applied to each tray in either a serial or parallel fashion.

In various embodiments the supplemental coating may be applied using a system comprising two stationary nozzles disposed above the trays, with each nozzle outputting a spray pattern in the form of a wall or curtain (much like an air knife) as the trays pass underneath. As such, each nozzle (or combination of nozzles) produces a spray pattern terminating in a line suitably orthogonal to the direction of workpiece travel. In an embodiment, one nozzle may be angled forward (towards the direction of tray travel) and the other nozzle angled rearwards to ensure complete coating of the inclined sidewalls, structural ribs, and any other geometric features.

Alternatively, for substantially flat trays with limited sidewall depths, or for applications in which film uniformity is less important, a single curtain-type spray configuration may be employed.

One metric for evaluating whether a tray has received sufficient coverage (e.g., has been adequately coated) involves comparing the weight of a tray before and after coating to determine whether the weight of the coating material applied to the tray satisfies a predetermined threshold value (or range). Alternatively, or in addition, the thickness of the applied film may be measured to determine whether the thickness of the coating satisfies a predetermined threshold value (or range of values).

In some embodiments the uniformity of the applied coating may also be measured and process parameters adjusted as need to facilitate uniformity of application on future trays, in this regard, uniformity involve at least two considerations, namely: i) whether the film layer at a local point or region is too thin such that an effective barrier is not formed; and ii) whether the film layer at a local point or region is too thick such that the finished tray at that point may not dry thoroughly, resulting in blemishes or skinning (where a top layer of the film slides off or otherwise becomes detached from the film).

The coated trays are then dried in an oven in the range of 70-180° C., and preferably about 80-110° C., and most preferably about 95° C. for approximately one (1) minutes to remove moisture from and otherwise cure the film layer, as appropriate. An infrared (IR) sensor may be used to probe the temperature of a meat tray at one or a plurality of points to ensure that the proper curing temperature has been achieved.

For meat trays the coating composition may comprise 25% acrylic and 75% water, where the acrylic may comprise an acrylic copolymer latex or similar material, such as Rhobarr 110 binder available from the DOW Chemical Corporation. In this context, the coating functions as an anti-stick layer to keep the top layer of the meat tray from peeling off as frozen meat is removed from the tray.

In some embodiments, some or all of the opposite side of the tray (including the bottom surface and/or exterior sidewalls) may also be coated. This reduces the extent to which frozen juices (e.g., blood, oil, water) from the meat may stick to the outside of the tray if, for example, juice leaks around the seal between the tray and the outer plastic wrap when the package is stored on its side.

Meat trays typically do not require a separate oil barrier, although the vapor and/or anti-stick barriers may also effectively inhibit oil transmission.

As an alternative to or in addition to an acrylic, a pea emulsion plus an alginate could also be used for meat trays, microwave bowls, and/or other packaging components.

After drying, the trays are stacked, boxed, and shipped.

The term "ready-to-eat" (RTE) trays refer to containers within which salads, fruits, prepared meals, and other foods are packaged using a plastic film sealed about the tray perimeter and stored, often in a refrigerator. RTE trays may be coated to provide an oxygen barrier to improve freshness and shelf life.

RTE trays without a topical film barrier may be made by adding to an OCC/DLK slurry comprising 30-100% OCC/DLK and 0-70% virgin pulp, and preferably about 100% OCC/DLK: i) an oil barrier comprising 1-5% and preferably about 4% Daikin 8111; ii) a moisture/water barrier comprising 2-5% and preferably about 3.5% AKD; and iii) a strengthening component comprising 3% starch such as Hercobond.

RTE trays with a topical film barrier may be made in substantially the same way described above (but perhaps eliminating the 8111 oil barrier and/or increase the AKD to 4%), and also adding a topical oxygen barrier comprising an acrylic in water solution (e.g., 25% Robar 110 and 75% water). For RTE trays and containers (e.g., yogurt cups), the film is typically thicker than that described above in the context of meat trays, in order to ensure more complete (e.g., 100%) coverage.

Uncoated microwave bowls may be made using a slurry comprising up to 100% virgin fiber (softwood, hardwood, or a combination thereof). In one embodiment, the slurry base comprises about 45% bleached hardwood, about 35% bleached softwood, and about 25% unbleached softwood. The slurry may also include an oil barrier (e.g., 2.5% 8111), a water barrier (e.g., 3% AKD), a dry strength additive (e.g., 2.5% starch), a retention additive (e.g., 0.15% Nalco), and a de-foaming component (e.g., 1.5% Expair) to remove entrained air.

Coated microwave bowls may be made using a substantially virgin fiber slurry base such as that described above in connection with uncoated microwave bowls, and further including about 3% water barrier (AKD) and about 2.5% starch, but without the oil barrier, the retention additive, and the defoamer. The coating formulation may comprise about 27.5% solids in a water solution. The 27.5% solids may comprise a suitable combination of all or some of the following five (5) components (sometimes referred to as a DWP formulation): i) 25% acrylate; ii) 1.8% rice bran wax (which may reduce tackiness); iii) 0.4% pectin (which may facilitate the formation of a vapor barrier and also reduce tackiness to facilitate de-nesting of stacked bowls); iv) 0.3% pea protein (which may facilitate emulsion of the rice bran wax); and v) 0.2% liquid ammonium or other additive to adjust the pH to thereby facilitate acrylate curing.

For bowls and other packaging components having deep sidewalls, the curtain-type spray output terminating in a line is inadequate. To address this challenge, the present inventors have developed a two nozzle spray paradigm which involves a full cone spray pattern coupled with a hollow cone spray pattern which together provide adequate coverage for bottom surfaces as well as sidewall features without overspraying the bottom surface.

In a preferred embodiment the coating is applied to microwave bowls using a two nozzle system disposed above a conveyor which carries the bowls through the spray coating station. A first "full cone" nozzle is configured to cover the center (bottom) of each bowl, and a second "hollow cone" nozzle is configured to cover the inside sidewall of each bowl. The full cone and hollow cone spray patterns are suitable configured to ensure complete coverage while minimizing excess film thickness at the region where the full cone pattern overlaps the hollow cone pattern.

In a preferred embodiment, as the bowls or other packaging component travels along the conveyor, the nozzle system also travels along the same path for a predetermined period of time, such that the nozzle or nozzles do not translate relative to a bowl during spraying. Accordingly, the nozzle(s) may remain "stationary" with respect to each bowl without compromising throughput.

Coated yogurt cups may be made using a substantially virgin fiber slurry base such as that described above in connection with uncoated microwave bowls, and further including about 4% water barrier (AKD) and 3% starch. In lieu of (or in addition to) the spraying methods discussed above, a topical oxygen barrier layer may be applied using either: i) a full immersion step in which the cup is dipped into a pool of coating solution to thereby coat both the inside and outside surfaces; or ii) or a "fill and dump" technique in which coating solution is poured into the cup until it is full, and thereafter dumped out to coat the inside surfaces of the cup. In this context, the same or a more dilute (lower acrylate concentration) version of the aforementioned DWP formulation may be employed. In addition, the poured solution may be recirculated in an open or closed loop system to reduce waste.

The coated cups may then be dried in an oven at about 95° C. for about one minute and thereafter, stacked, boxed, and shipped.

In traditional macaroni and cheese (mac 'n cheese) bowls the pasta is dry and the cheese is typically separately packaged in a plastic or foil envelope; as such, an oxygen barrier layer may or may not be needed. If an oxygen layer is desired, it may be applied, for example, using either the full immersion or pour and dump techniques (or both) described above. If an oxygen layer is not needed, an anti-stick coating may be applied as described above.

An alternate version of the DWP formulation involves eliminating 0.3% pea protein (which is a powder) and using 0.05% Tween 80 (an emulsifier) to perform substantially the same function to emulsify the rice wax.

In addition, instead of using powdered pectin, we use an aqueous version which is easier to mix.

Formulations for topical coatings may include the following:

| Example 1 | | |
| --- | --- | --- |
| Ingredient | wet basis (%) | Dry basis (%) |
| Acrylic Polymers | 5-60 | 95.78-80.43 |
| Rice Bran Wax | 0.1-12 | 1.92-16.09 |
| Pea Protein Isolate | 0.02-2 | 0.38-2.68 |
| Pectin | 0.1-0.6 | 1.92-0.80 |
| Aqua Ammonia (pH = 9.0 using 4% solution) | 0.1-0.2 | 0 |
| Water | 94.68-25.2 | 0 |
| Total | | |

| Example 2 | | |
| --- | --- | --- |
| Ingredient | wet basis (%) | Dry basis (%) |
| Acrylic Polymers | 20-30 | 95.69-88.24 |
| Rice Bran Wax | 0.6-3 | 2.87-8.82 |
| Pea Protein Isolate | 0.1-0.5 | 0.48-1.47 |
| Pectin | 0.2-0.5 | 0.96-1.47 |
| Aqua Ammonia (pH = 9.0 using 4% solution) | 0.1-0.2 | 0 |
| Water | 79-65.8 | 0 |
| Total | | |

Example 3

| Ingredient | wet basis (%) | Dry basis (%) |
|---|---|---|
| Acrylic Polymers | 25 | 90.91 |
| Rice Bran Wax | 1.8 | 6.55 |
| Pea Protein Isolate | 0.3 | 1.09 |
| Pectin | 0.4 | 1.45 |
| Aqua Ammonia (pH = 9.0 using 4% solution) | 0.1 | 0 |
| Water | 72.4 | 0 |
| Total | 100 | 100 |

More generally, the DWP spray coating may be described as an aqueous formulation containing in the range of 15-40% by weight total solids, and preferably in the range of 25-30%, and most preferably about 27.5%. One ingredient in this formulation may comprise acrylic polymers which, upon curing, crosslink and polymerize to facilitate forming desired moisture, oil, and/or oxygen barrier layers. This formulation also contains rice bran wax to provide non-stick properties and non-glossy surface finishing of the coated surface. The wax is emulsified with pea protein for stable aqueous dispersal. This formulation also contains pectin as a viscosity modifier for optimal adhesion to hydrophobic fibrous surface during spray coating. pH of formulation is around 9.0 with added ammonia to maintain solubility of the acrylic polymers.

Exemplary methods for preparing a solution to applied as a topical coating will now be described in the context of a seventy-five (75) gallon batch using the following definitions:

RBW: Rice Bran Wax
PP: Pea Protein
Pec: Pectin
G: Gallons
L: Liters
kg: Kilograms Heat 35.6 gallons of water to at least 185° F., and mix in 5.1 kg RBW at high speed for approximately 12 minutes until the wax pellets are fully melted and the temperature of the solution returns to 185° F. Add 0.85 kg PP to the mixture over approximately one minute. Mix the PP for an additional ten minutes or longer until no clumps are visible. Add 1.14 kg Pec over 0.5 minutes and allow the contents to mix for an additional 15 minutes or longer until there no clumps are visible. Continue mixing at low speed and bring the batch temperature to approximately 120° F. While mixing add 37.5 gallons Rhobarr 110 to the batch and continue to mix for ten minutes. Slowly pour 2.15 L of 4% ammonia to the batch and continue mixing for ten additional minutes.

Referring now to FIG. 1, an exemplary vacuum forming system and process 100 using a fiber-based slurry includes a first stage 101 in which mold (not shown for clarity) in the form of a mirror image of the product to be manufactured is envelop in a thin wire mesh form 102 to match the contour of the mold. A supply 104 of a fiber-based slurry 104 is input at a pressure (P1) 106 (typically ambient pressure). By maintaining a lower pressure (P2) 108 inside the mold, the slurry is drawn through the mesh form, trapping fiber particles in the shape of the mold, while evacuating excess slurry 110 for recirculation back into the system.

With continued reference to FIG. 1, a second stage 103 involves accumulating a fiber layer 130 around the wire mesh in the shape of the mold. When the layer 130 reaches a desired thickness, the mold enters a third stage 105 for either wet or dry curing. In a wet curing process, the formed part is transferred to a heated press (not shown) and the layer 130 is compressed and dried to a desired thickness, thereby yielding a smooth external surface finish for the finished part. In a dry curing process, heated air is passed directly over the layer 130 to remove moisture therefrom, resulting in a more textured finish much like a conventional egg carton.

In accordance with various embodiments the vacuum mold process is operated as a closed loop system, in that the unused slurry is re-circulated back into the bath where the product is formed. As such, some of the chemical additives (discussed in more detail below) are absorbed into the individual fibers, and some of the additive remains in the water-based solution. During vacuum formation, only the fibers (which have absorbed some of the additives) are trapped into the form, while the remaining additives are re-circulated back into the tank. Consequently, only the additives captured in the formed part must be replenished, as the remaining additives are re-circulated with the slurry in solution. As described below, the system maintains a steady state chemistry within the vacuum tank at predetermined volumetric ratios of the constituent components comprising the slurry.

Figure 2:
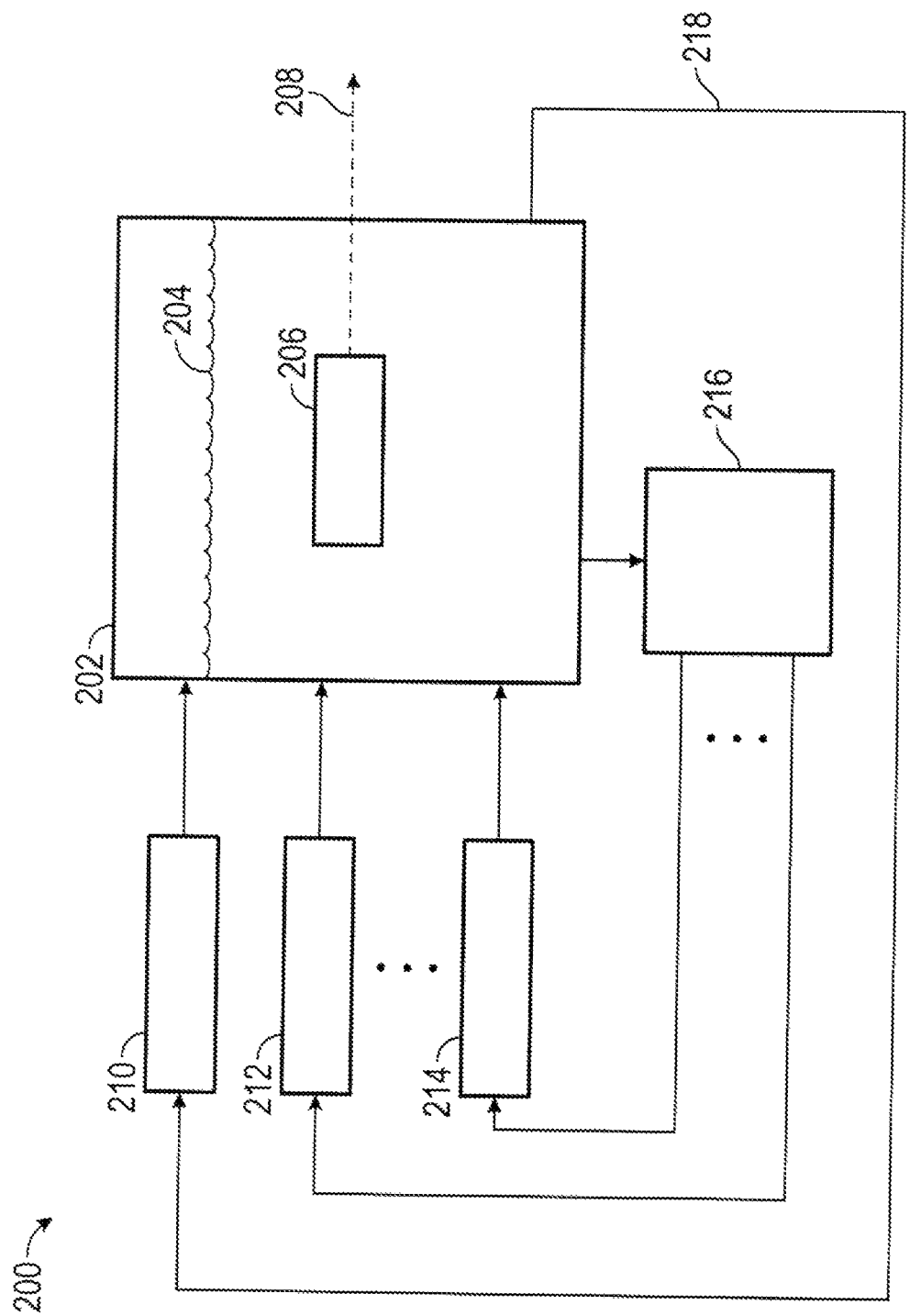
FIG. 2 is a schematic block diagram of an exemplary closed loop slurry system for controlling the chemical composition of the slurry in accordance with various embodiments.

Referring now to FIG. 2, is a closed loop slurry system 200 for controlling the chemical composition of the slurry. In the illustrated embodiment a tank 202 is filled with a fiber-based slurry 204 having a particular desired chemistry, whereupon a vacuum mold 206 is immersed into the slurry bath to form a molded part. After the molded part is formed to a desired thickness, the mold 206 is removed for subsequent processing 208 (e.g., forming, heating, drying, top coating, and the like).

In a typical wet press process, the Hot Press Temperature Range is around 150-250 degree C., with a Hot Press Pressure Range around 140-170 kg/cm$^2$. The final product density should be around 0.5-1.5 g/cm$^3$, and most likely around 0.9-1.1 g/cm$^3$. Final product thickness is about 0.3-1.5 mm, and preferably about 0.5-0.8 mm.

With continued reference to FIG. 2, a fiber-based slurry comprising pulp and water is input into the tank 202 at a slurry input 210. In various embodiments, a grinder may be used to grind the pulp fiber to create additional bonding sites. One or more additional components or chemical additives may be supplied at respective inputs 212-214. The slurry may be re-circulated using a closed loop conduit 218, adding additional pulp and/or water as needed. To maintain a steady state balance of the desired chemical additives, a sampling module 216 is configured to measure or otherwise monitor the constituent components of the slurry, and dynamically or periodically adjust the respective additive levels by controlling respective inputs 212-214. Typically, the slurry concentration is around 0.1-1%, most ideally around 0.3-0.5% and preferably about 0.4-0.5%. In one embodiment, the various chemical constituents are maintained at a predetermined desired percent by volume; alternatively, the chemistry may be maintained based on percent by weight or any other desired control modality.

The pulp fiber used in 202 can also be mechanically grinded to improve fiber-to-fiber bonding and improve bonding of chemicals to the fiber. In this way the slurry undergoes a refining process which changes the freeness, or drainage rate, of fiber materials. Refining physically modifies fibers to fibrillate and make them more flexible to achieve better bonding. Also, the refining process can increase tensile and burst strength of the final product. Freeness, in various embodiments, is related to the surface conditions and swelling of the fibers. Freeness (csf) is suitably within the range of 200-700, and preferably about 350-550 for many of the processes and products described herein.

Various chemical formulations (sometimes referred to herein as "chemistries"), spray coating and immersion systems, and nozzle configurations and product configurations for various fiber-based packages and containers, as well as various methods for applying topical coatings, will now be further described in conjunction with FIGS. 3-8.

Figure 3:
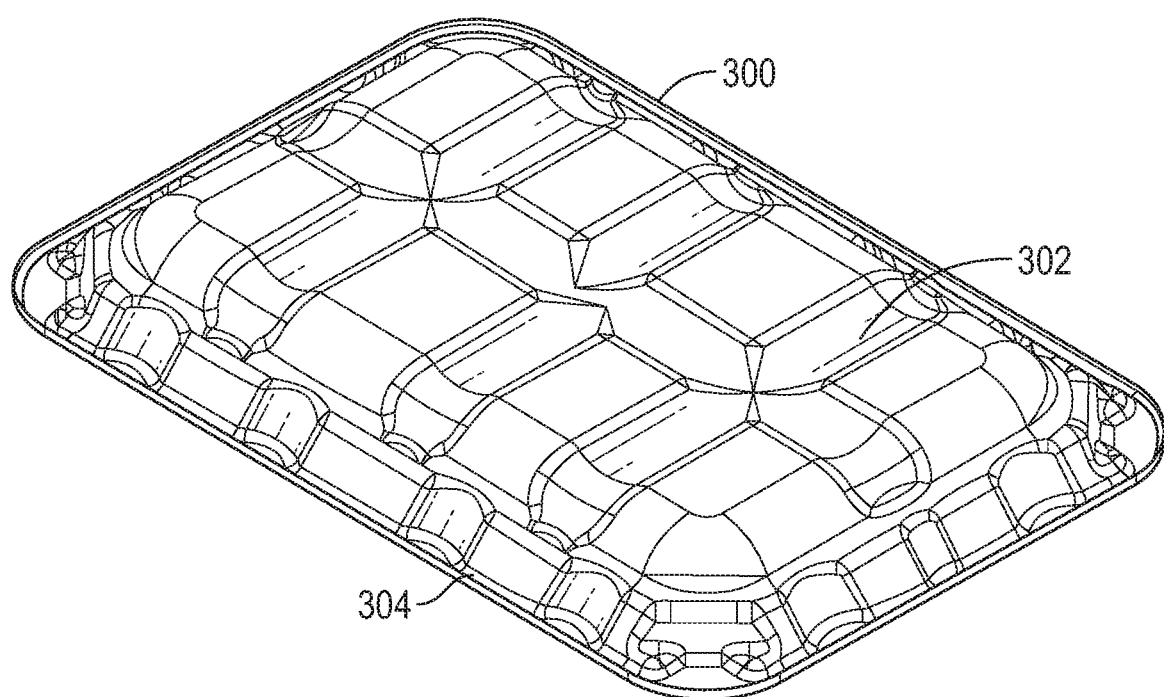
FIG. 3 is a perspective view of the bottom side of an exemplary meat tray in accordance with various embodiments.

FIG. 3 is a perspective view of a meat tray 300 illustrating the underside 302 of the bottom surface and the outside surfaces of side walls 304.

Figure 4:
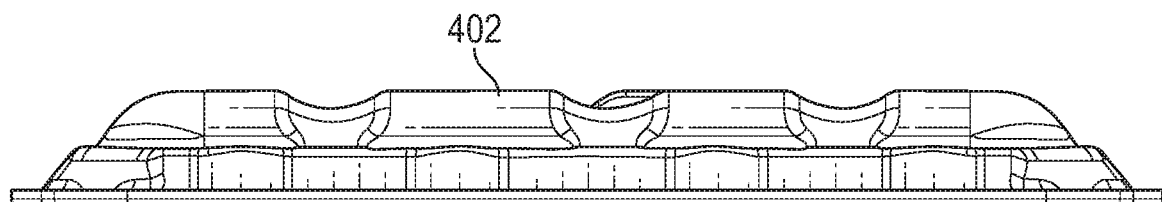
FIG. 4 is a side elevation view of the meat tray of FIG. 3 in accordance with various embodiments.

FIG. 4 is a side elevation view of the meat tray 402 of FIG. 3.

Figure 5:
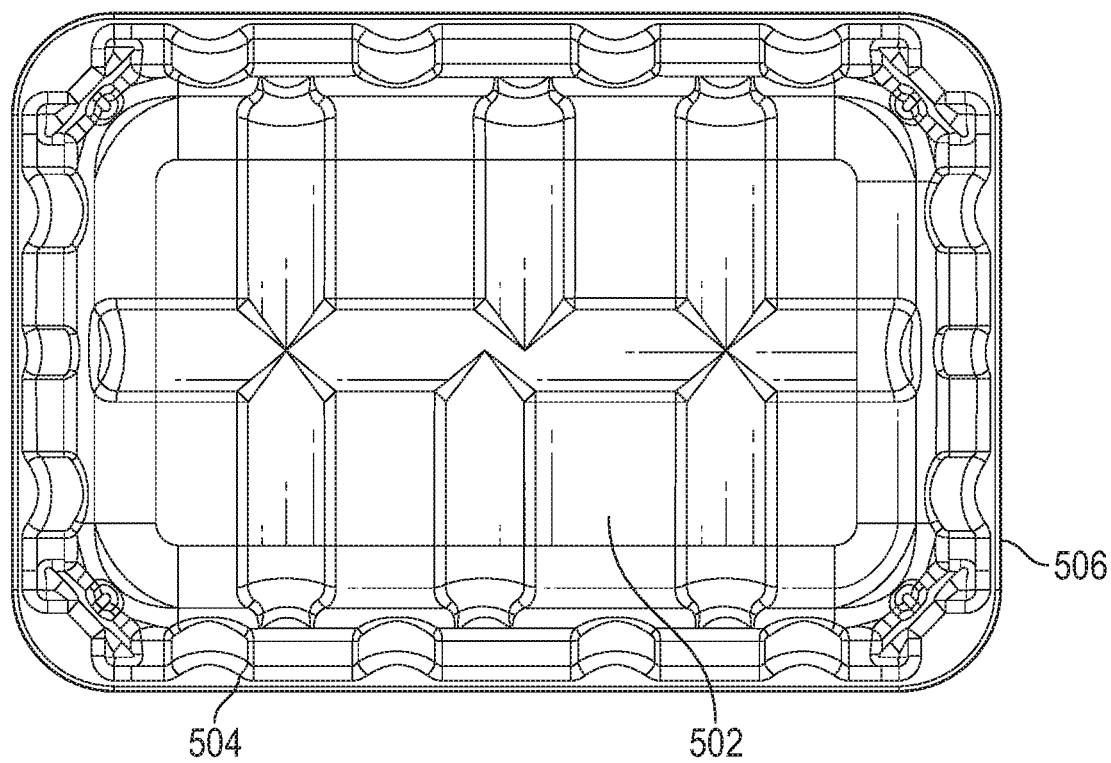
FIG. 5 is a top plan view of the meat tray of FIGS. 3 and 4 in accordance with various embodiments.

FIG. 5 is a top plan view of the meat tray of FIGS. 3 and 4 illustrating the top surface 502 of the bottom region of the tray, and respective side walls 504 and 506.

Figure 6:
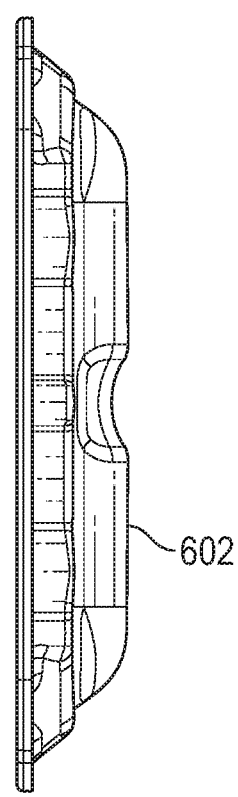
FIG. 6 is an end view of the meat tray of FIG. 5 in accordance with various embodiments.

FIG. 6 is an end view of the meat tray 602 of FIG. 5.

Figure 7:
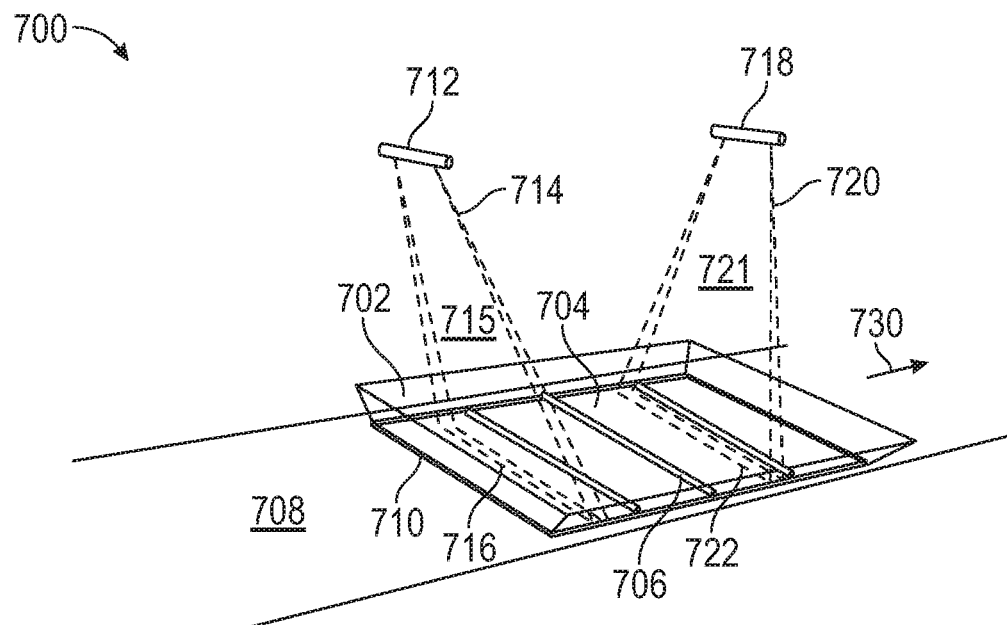
FIG. 7 is a schematic perspective of a spray coating system for meat trays in accordance with various embodiments.

FIG. 7 is a schematic perspective of a spray coating system 700 useful for spray coating meat trays in accordance with various embodiments.

More particularly, system 700 includes a conveyor 708 having a pocket 710 for holding a tray as it is conveyed along a direction indicated by arrow 730. The tray includes a bottom panel 704 having structural features (e.g. ribs) 706 and is circumscribed by a side wall 702.

With continued reference to FIG. 7, the illustrated spray system comprises respective first and second spray nozzles 712 and 718. Nozzle 712 is configured to discharge a substantially planar spray pattern 715 bounded by side edges 714 and terminating in a line 716 substantially orthogonal to direction 730. Nozzle 718 is configured to discharge a substantially planar spray pattern 721 bounded by side edges 720 and terminating in a line 716 substantially orthogonal to direction 722. As the tray passes underneath the spray nozzles, spray lines 716 and 722 apply the coating to all or selected portions of bottom surface 704 and/or the inside surfaces of sidewall 702.

Figure 8:
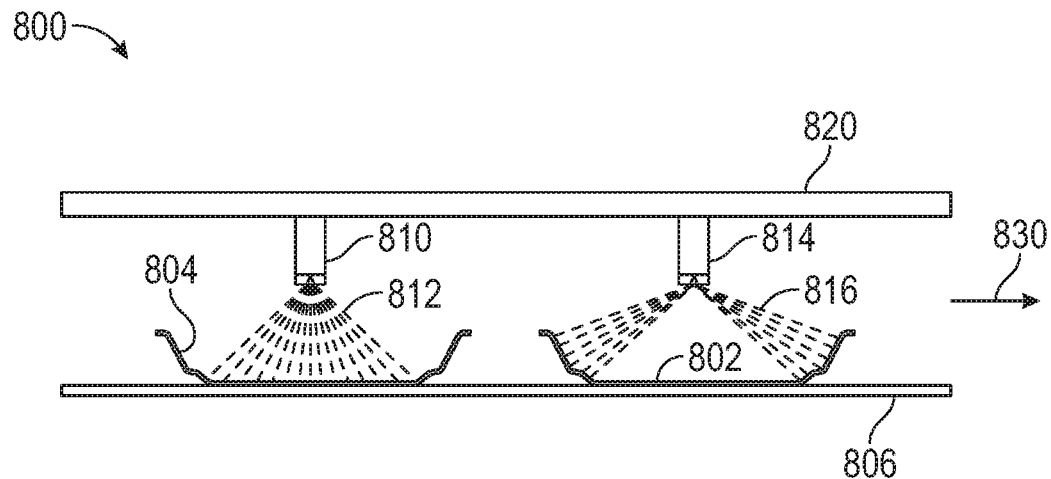
FIG. 8 is a schematic perspective of a spray coating system employing a full cone and hollow cone dual nozzle system for use with microwave, frozen food, prepared meals, and other food containers having deep side walls in accordance with various embodiments.

FIG. 8 is a schematic perspective of a spray coating system 800 including a full cone nozzle 810 configured to discharge a full cone spray pattern, and a hollow cone nozzle 814 configured to discharge an annular (or "doughnut") shaped spray pattern. In particular, system 800 is configured to apply a full cone spray pattern 812 to an inside bottom surface 802 of the workpiece (bowl). System 800 is further configured to apply a hollow cone spray pattern 816 to the inside surface of the workpiece side walls 804.

With continued reference to FIG. 8, conveyor 806 is configured to carry trays along a direction defined by arrow 830 (to the right in FIG. 8). In one embodiment, conveyor 806 may be configured to sequentially index in the direction of arrow 830 to thereby position successive trays under stationary nozzles 810, 814 suspended from stationary platen 820. In this position, the bowl on the left may have its bottom spray coated while the bowl on the right has its sidewalls spray coated. After indexing to the next position, the bowl previously underneath nozzle 810 is then disposed under nozzle 814, and so on.

In an alternate embodiment, total workpiece throughput may be increased by operating conveyor 806 in a continuous fashion (as opposed to sequentially indexing). In order to maintain positional registration between the nozzle system and the underlying workpieces during application of the spray coating, platen 820 may be configured to travel to the right along with conveyor 830 to temporarily suspend relative motion between the nozzles, and thereafter shift leftwardly to align the nozzles with the next series of workpieces to be coated.

While FIG. 8 illustrates two workpieces and one of each of a full cone and hollow cone nozzle, those skilled in the art will appreciate that the system may be scaled to accommodate any number of nozzles and workpieces for each reciprocating operation of platen 820.

As briefly mentioned above, the various slurries used to vacuum mold containers according to the present invention comprises a fiber base mixture of pulp and water, with added chemical components to impart desired performance characteristics tuned to each particular product application. The base fiber may include any one or combination of at least the following materials: softwood (SW), bagasse, bamboo, old corrugated containers (OCC), and newsprint (NP). Alternatively, the base fiber may be selected in accordance with the following resources, the entire contents of which are hereby incorporated by this reference: "Lignocellulosic Fibers and Wood Handbook: Renewable Materials for Today's Environment," edited by Mohamed Naceur Belgacem and Antonio Pizzi (Copyright 2016 by Scrivener Publishing, LLC) and available at https://books.google.com/books?id=jTL8CwAAQBAJ&printsec=frontcover#v=onepage&q&f=fal se; "Efficient Use of Flourescent Whitening Agents and Shading Colorants in the Production of White Paper and Board" by Liisa Ohlsson and Robert Federe, Published Oct. 8, 2002 in the African Pulp and Paper Week and available at tappsa.co.za/archive/APPW2002/Title/Efficient_use_of_fluorescent_w/efficient_use_of_fluorescent_w.html; Cellulosic Pulps, Fibres and Materials: Cellucon '98 Proceedings, edited by J F Kennedy, G O Phillips, P A Williams, copyright 200 by Woodhead Publishing Ltd. and available at books.google.com/books?id=xO2iAgAAQBAJ&printsec=frontcover#v=onepage&q&f=false; and U.S. Pat. No. 5,169,497 A entitled "application of Enzymes and Flocculants for Enhancing the Freeness of Paper Making Pulp" issued Dec. 8, 1992.

For vacuum molded produce containers manufactured using either a wet or dry press, a fiber base of OCC or OCC/DLK and NP may be used, where the OCC/DLK component is between 50%-100%, and preferably about 70% OCC/DLK and 30% NP or VNP, with an added moisture/water repellant in the range of 1%-10% by weight, and preferably about 1.5%-4%, and most preferably about 4%. In a preferred embodiment, the moisture/water barrier may comprise alkyl ketene dimer (AKD) (for example, Hercon 79, Hercon 80) and/or long chain diketenes, available from FOBCHEM at fobchem.com/html_products/Alkyl-Ketene-Dimer%EF%BC%88AKD-WAX%: EF%BC%89.html#,V0zozvkrKUk; and Yanzhou Tiancheng Chemical Co., Ltd. at yztianchengchem.com/en/index.php?m=content&c=index&a=show&catid=38&id=124&g clid=CPbn65aUg80CFRCOaQod0JUGRg.

In order to yield specific colors for molded pulp products, cationic dye or fiber reactive dye may be added to the pulp. Fiber reactive dyes, such as Procion MX, bond with the fiber at a molecular level, becoming chemically part of the fabric. Also, adding salt, soda ash and/or increase pulp temperature will help the absorbed dye to be furtherly locked in the fabric to prevent color bleeding and enhance the color depth.

To enhance structural rigidity, a starch component may be added to the slurry, for example, liquid starches available commercially as Topcat® L98 cationic additive (or Hercobond 6950 available from Solenis LLC), Hercobond, and Topcat® L95 cationic additive (available from Penford Products Co. of Cedar Rapids, Iowa). Alternatively, the liquid starch can also be combined with low charge liquid cationic starches such as those available as Penbond® cationic additive and PAF 9137 BR cationic additive (also available from Penford Products Co., Cedar Rapids, Iowa).

For dry press processes, Topcat L95 or Hercobond 6950 may be added as a percent by weight in the range of 0.5%-10%, and preferably about 1%-7%, and particularly for products which need maintain strength in a high moisture environment most preferably about 6.5%; otherwise, most preferably about 1.5-2.0%. For wet press processes, dry strength additives such as Topcat L95 or Hercobond 6950 which are made from modified polyamines that form both hydrogen and ionic bonds with fibers and fines. Dry strength additives help to increase dry strength, as well as drainage and retention, and are also effective in fixing anions, hydrophobes and sizing agents into fiber products. Those additives may be added as a percent by weight in the range of 0.5%-10%, and preferably about 1%-6%, and most preferably about 3.5%. In addition, both wet and dry processes may benefit from the addition of wet strength additives, for example solutions formulated with polyamide-epichlorohydrin (PAE) resin such as Kymene 920A or 1500 or similar component available from Ashland Specialty Chemical Products at ashland.com/products. In a preferred embodiment, Kymene 920A or 1500 may be added in a percent by volume range of 0.5%-10%, and preferably about 1%-4%, and most preferably about 2% or equal amount with dosing of dry strength additives. Kymene 920A or 1500 is of the class of polycationic materials containing an average of two or more amino and/or quaternary ammonium salt groups per molecule. Such amino groups tend to protonate in acidic solutions to produce cationic species. Other examples of polycationic materials include polymers derived from the modification with epichlorohydrin of amino containing polyamides such as those prepared from the condensation adipic acid and dimethylene triamine, available commercially as Hercosett 57 from Hercules and Catalyst 3774 from Ciba-Geigy.

The present inventor has determined that molded fiber containers can be rendered suitable as single use food containers suitable for use in microwave, convection, and conventional ovens by embedding barrier chemistries into the slurry, adding a topical coating to the finished vacuum formed container, or both. In particular, the slurry and/or topical coating chemistry should advantageously accommodate one or more of the following three performance metrics: i) moisture barrier; ii) oil barrier; and iii) water vapor (condensation) barrier to avoid condensate due to placing the hot container on a surface having a lower temperature than the container.

In this context, the extent to which water vapor permeates the container is related to the porosity of the container, which the present invention seeks to reduce. That is, even if the container is effectively impermeable to oil and water, it may nonetheless compromise the user experience if water vapor permeates the container, particularly if the water vapor condenses on a cold surface, leaving behind a moisture ring. The present inventor has further determined that the condensate problem is uniquely pronounced in fiber-based applications because water vapor typically does not permeate a plastic barrier.

Accordingly, for microwavable containers the present invention contemplates a fiber or pulp-based slurry including a water barrier, oil barrier, and water vapor barrier, and an optional retention aid. In an embodiment, a fiber base of softwood (SW)/bagasse at a ratio in the range of about 10%-90%, and preferably about 7:3 may be used. As a moisture barrier, AKD may be used in the range of about 0.5%-10%, and preferably about 1.5%-4%, and most preferably about 3.5%. As an oil barrier, the grease and oil repellent additives are usually water based emulsions of fluorine containing compositions of fluorocarbon resin or other fluorine-containing polymers such as UNIDYNE TG 8111 or UNIDYNE TG-8731 available from Daikin or World of Chemicals at worldofchemicals.com/chemicals/chemical-properties/unidyne-tg-8111.html. The oil barrier component of the slurry (or topical coat) may comprise, as a percentage by weight, in the range of 0.5%-10%, and preferably about 1%-4%, and most preferably about 2.5%. As a retention aid, an organic compound such as Nalco 7527 available from the Nalco Company of Naperville, Ill. May be employed in the range of 0.1%-1% by volume, and preferably about 0.3%. Finally, to strengthen the finished product, a dry strength additive such as an inorganic salt (e.g., Hercobond 6950 available at solenis.com/en/industries/tissue-towel/innovations/hercobond-dry-strength-additives/; see also sfm.state.or.us/CR2K_SubDB/MSDS/HERCOBOND_6950.PDF) may be employed in the range of 0.5%-10% by weight, and preferably about 1.5%-5%, and most preferably about 4%.

As mentioned, vapor barrier performance is directly impacted by porosity of the fiber tray. Reducing the porosity of the fiber tray and, hence, improving vapor barrier performance can be achieved using at least two approaches. One is by improving freeness of the tray material by grinding the fibers. The second way is by topical spray coating using, for example, Daikin 52066, which is a water based long chain Fluorine-containing polymer. Spray coating may be implemented using in the range of about 0.1%-3% by weight, and preferably about 0.2%-1.5%, and most preferably about 1%.

Presently known meat trays, such as those used for the display of poultry, beef, pork, and seafood in grocery stores, are typically made of plastic based materials such as polystyrene and Styrofoam, primarily because of their superior moisture barrier properties. The present inventor has determined that variations of the foregoing chemistries used for microwavable containers may be adapted for use in meat trays, particularly with respect to the moisture barrier (oil and porosity barriers are typically not as important in a meat tray as they are in a microwave container).

Accordingly, for meat containers the present invention contemplates a fiber or pulp-based slurry including a water barrier and an optional oil barrier. In an embodiment, a fiber base of softwood (SW)/bagasse and/or bamboo/bagasse at a ratio in the range of about 10%-90%, and preferably about 7:3 may be used. As a moisture/water barrier, AKD may be used in the range of about 0.5%-10%, and preferably about 1%-4%, and most preferably about 4%. As an oil barrier, a water based emulsion may be employed such as UNIDYNE TG 8111 or UNIDYNE TG-8731. The oil barrier component of the slurry (or topical coat) may comprise, as a percentage by weight, in the range of 0.5%-10%, and preferably about 1%-4%, and most preferably about 1.5%. Finally, to strengthen the finished product, a dry strength additive such as Hercobond 6950 may be employed in the range of 0.5%-10% by weight, and preferably about 1.5%-4%, and most preferably about 4%.

As discussed above in connection with the produce containers, the slurry chemistry and/or spray coating chemistry may be combined with structural features to provide prolonged rigidity over time by preventing moisture/water from penetrating into the tray.

A method of manufacturing a meat tray is thus provided. The method includes: providing a wire mesh mold approximating the shape of the meat tray; preparing an aqueous fiber based slurry comprising at least one of old corrugated containers (OCC) and double-lined kraft (DLK) paper; adding an embedded moisture barrier to the slurry; immersing the mold in the slurry; drawing a vacuum across the mold within the slurry until a desired thickness of fiber particles accumulates at a surface of the mold; removing the accumulated particles from the mold; drying and pressing the accumulated particles in a press to thereby form the meat tray; transferring the meat tray from the press to a coating station; and applying a supplemental moisture barrier layer to a surface of the meat tray at the coating station.

In an embodiment, the embedded moisture barrier comprises 2%-5% alkyl ketene dimer (AKD).

In an embodiment, the method further includes adding a dry strength additive to the slurry.

In an embodiment, the dry strength additive comprises 0.5%-4.5% starch.

In an embodiment, the coating station comprises: a spray system; and a conveyor configured to move the meat tray along a direction of travel into engagement with the spray system.

In an embodiment, the spray system comprises a first nozzle configured to discharge a first predetermined spray pattern onto the meat tray.

In an embodiment, the first predetermined spray pattern comprises a substantially vertical curtain terminating in a line at the meat tray, the line having a predetermined thickness and oriented substantially orthogonal to the direction of travel.

In an embodiment, the spray system further includes a second nozzle configured to discharge a second predetermined spray pattern onto the meat tray, wherein the first spray pattern is angled toward the direction of travel and the second spray pattern is angled away from the direction of travel.

In an embodiment, the supplemental moisture barrier layer comprises an acrylic copolymer latex in an aqueous solution.

In an embodiment, the supplemental moisture barrier layer comprises an approximately 1:3 solution of acrylic and water.

A method is also provided for manufacturing a microwave bowl of the type characterized by a substantially flat, circular, bottom region bounded by a circumferential sidewall. The method includes: providing a wire mesh mold approximating the shape of the bowl; preparing an aqueous fiber based slurry comprising at least one of hardwood virgin fiber and softwood virgin fiber; adding an embedded moisture barrier to the slurry; immersing the mold in the slurry; drawing a vacuum across the mold within the slurry until a desired thickness of fiber particles accumulates at a surface of the mold; removing the accumulated particles from the mold; drying and pressing the accumulated particles in a press to thereby form the bowl; transferring the bowl from the press to a coating station; and applying a topical oil barrier layer to at least a portion of the bowl at the coating station.

In an embodiment, the embedded moisture barrier comprises 2%-5% alkyl ketene dimer (AKD).

In an embodiment, the method further includes adding a dry strength additive to the slurry, wherein the dry strength additive comprises 0.5%-4.5% starch.

In an embodiment, the topical oil barrier layer comprises about 27.5% solids in a water solution.

In an embodiment, the solids comprise acrylate, rice bran wax, pectin, and pea protein.

In an embodiment, the coating station includes: a spray system; and a conveyor configured to move the bowl along a direction of travel underneath the spray system.

In an embodiment, the spray system includes: a first nozzle configured to discharge a full cone spray pattern onto the bottom region of the bowl; and a second nozzle configured to discharge a hollow cone spray pattern onto the inside surface of the circumferential sidewall.

In an embodiment, the method further includes the step of moving the spray system along the direction of travel such that: i) the first nozzle is disposed above and remains stationary with respect to the bowl for a first predetermined period of time; and ii) the second nozzle is disposed above and remains stationary with respect to the bowl for a second predetermined period of time.

In an embodiment, the first period of time is one of: i) greater than; ii) equal to; and iii) less than the second period of time.

A method is provided for manufacturing a fiber based microwave bowl of the type including a substantially circular bottom portion bounded by an inclined circumferential side wall. The method may include the steps of: providing a wire mesh mold approximating the shape of the bowl; preparing an aqueous fiber based slurry comprising up to 100% virgin fiber; adding an embedded moisture barrier to the slurry; immersing the mold in the slurry; drawing a vacuum across the mold within the slurry until a desired thickness of fiber particles accumulates at a surface of the mold; removing the accumulated particles from the mold; drying and pressing the accumulated particles in a press to thereby form the bowl; transferring the bowl from the press to a coating station; and applying an acrylic based oil barrier layer to a surface of the bowl at the coating station.

In an embodiment, the embedded moisture barrier comprises 2%-5% alkyl ketene dimer (AKD).

In an embodiment, the oil barrier layer comprises a calcium carbonate component to facilitate bonding to a bowl surface.

In an embodiment, the oil barrier layer comprises a pea emulsion.

In an embodiment, the oil barrier layer comprises an alginate.

In an embodiment, the oil barrier layer comprises an aqueous solution including about 25% acrylate and a first supplemental component configured to reduce tackiness.

In an embodiment, the first supplemental component comprises about 1.8% rice bran wax.

In an embodiment, the first supplemental component comprises about 0.4% pectin.

In an embodiment, the oil barrier layer comprises a second supplemental component configured to facilitate emulsion of the first supplemental component.

In an embodiment, the second supplemental component comprises about 0.3% pea protein.

In an embodiment, the oil barrier layer comprises a third supplemental component configured to adjust the PH level of the oil barrier coating to thereby facilitate acrylate curing.

In an embodiment, the third supplemental component comprises about 0.2% liquid ammonium.

In an embodiment, the coating station comprises: a spray system; and a conveyor configured to move the bowl along a direction of travel into engagement with the spray system.

In an embodiment, the spray system comprises a first nozzle configured to discharge a full cone spray pattern onto the bottom of the bowl.

In an embodiment, the spray system comprises a second nozzle configured to discharge a hollow cone spray pattern onto an inside surface of the sidewall.

In an embodiment, the oil barrier layer comprises an approximately 1:3 solution of acrylic and water.

A method is also provided for manufacturing a microwave bowl of the type characterized by a substantially flat, circular, bottom region bounded by a circumferential sidewall, comprising the steps of: providing a wire mesh mold approximating the shape of the bowl; preparing an aqueous fiber based slurry comprising at least one of hardwood virgin fiber and softwood virgin fiber; adding an embedded moisture barrier to the slurry; immersing the mold in the slurry; drawing a vacuum across the mold within the slurry until a desired thickness of fiber particles accumulates at a surface of the mold; removing the accumulated particles from the mold; drying and pressing the accumulated particles in a press to thereby form the bowl; transferring the bowl from the press to a coating station; and applying a topical oil barrier layer to at least a portion of the bowl at the coating station, the topical oil barrier layer comprising about 27.5% solids in a water solution.

In an embodiment, the solids comprise acrylate, rice bran wax, pectin, and pea protein.

A microwave bowl may be manufactured using any of the methods described herein.

While the present invention has been described in the context of the foregoing embodiments, it will be appreciated that the invention is not so limited. For example, the various spray systems and nozzle configurations, slurry chemistries, and spray coat chemistries may be adjusted to accommodate additional applications based on the teachings of the present invention.

As used herein, the word "exemplary" means "serving as an example, instance, or illustration." Any implementation described herein as "exemplary" is not necessarily to be construed as preferred or advantageous over other implementations, nor is it intended to be construed as a model that must be literally duplicated.

While the foregoing detailed description will provide those skilled in the art with a convenient road map for implementing various embodiments of the invention, it should be appreciated that the particular embodiments described above are only examples, and are not intended to limit the scope, applicability, or configuration of the invention in any way. To the contrary, various changes may be made in the function and arrangement of elements described without departing from the scope of the invention.

The invention claimed is:

1. A method of manufacturing a microwave bowl of the type characterized by a substantially flat, circular, bottom region bounded by a circumferential sidewall, comprising the steps of:
   providing a wire mesh mold approximating the shape of the bowl;
   preparing an aqueous fiber based slurry comprising at least one of hardwood virgin fiber and softwood virgin fiber;
   adding an embedded moisture barrier to the slurry;
   immersing the mold in the slurry;
   drawing a vacuum across the mold within the slurry until a desired thickness of fiber particles accumulates at a surface of the mold;
   removing the accumulated particles from the mold;
   drying and pressing the accumulated particles in a press to thereby form the bowl;
   transferring the bowl from the press to a coating station; and
   applying a topical oil barrier layer to at least a portion of the bowl at the coating station;
   wherein the coating station comprises a spray system and a conveyor configured to move the bowl along a direction of travel underneath the spray system, and the spray system comprises: a first nozzle configured to discharge a full cone spray pattern onto the bottom region of the bowl; and a second nozzle configured to discharge a hollow cone spray pattern onto the inside surface of the circumferential sidewall.

2. The method of claim 1, wherein the embedded moisture barrier comprises 2%-5% alkyl ketene dimer (AKD).

3. The method of claim 1, further comprising:
   adding a dry strength additive to the slurry, wherein the dry strength additive comprises 0.5%-4.5% starch.

4. The method of claim 1, wherein the topical oil barrier layer comprises about 27.5% solids in a water solution.

5. The method of claim 4, wherein the solids comprise a tackiness component and an emulsifier.

6. The method of claim 1, further comprising the step of:
   moving the spray system along the direction of travel such that: i) the first nozzle is disposed above and remains stationary with respect to the bowl for a first predetermined period of time; and ii) the second nozzle is disposed above and remains stationary with respect to the bowl for a second predetermined period of time.

7. The method of claim 6, wherein the first period of time is one of: i) greater than; ii) equal to; and iii) less than the second period of time.

* * * * *